T. J. WATERS.
LUBRICANT SEPARATOR.
APPLICATION FILED FEB. 13, 1909.
945,427.
Patented Jan. 4, 1910.
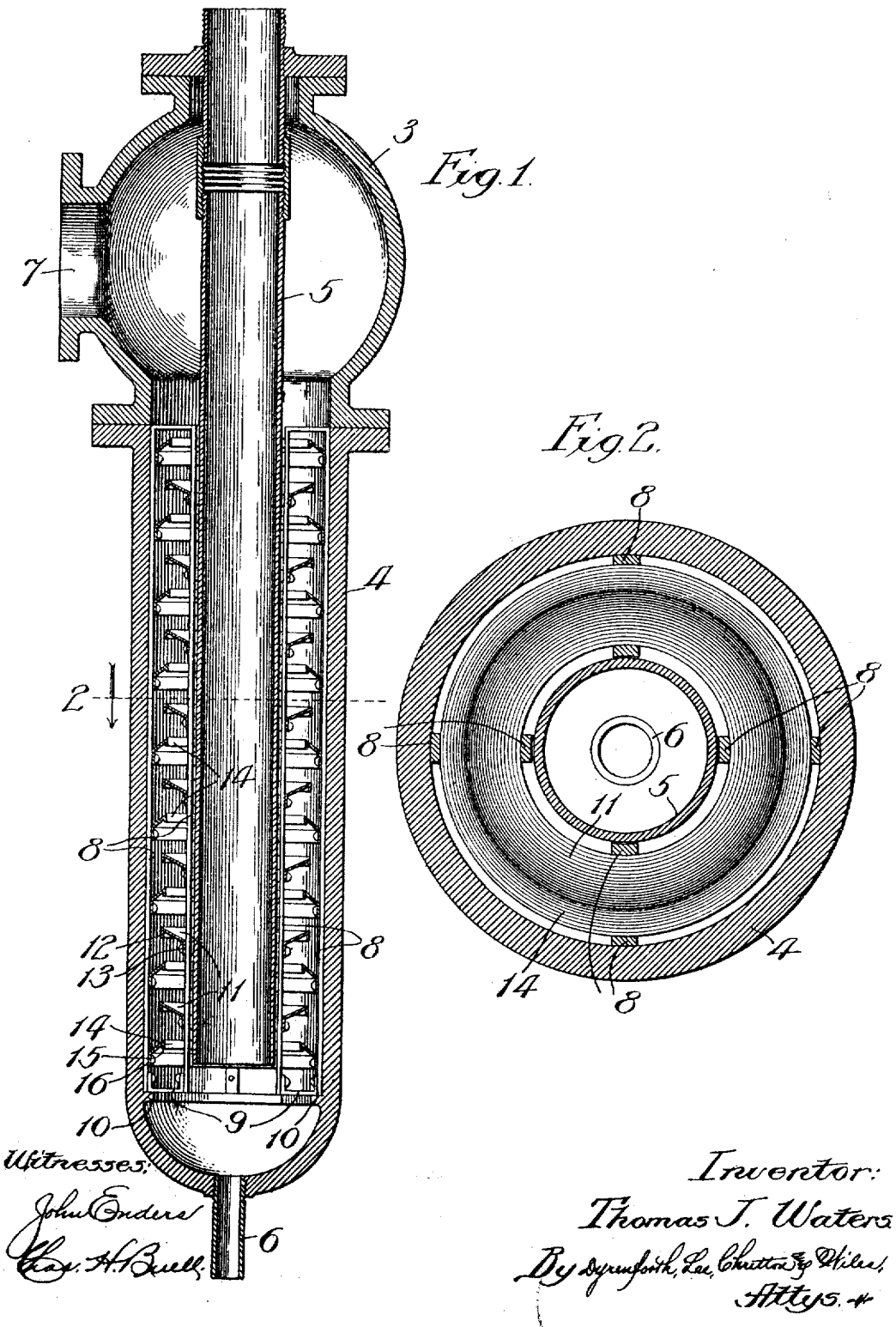
Witnesses:
John Enders
Chas. H. Buell
Inventor:
Thomas J. Waters
By Dyrenforth, Lee, Chritton & Wiles
Attys.

UNITED STATES PATENT OFFICE.

THOMAS J. WATERS, OF CHICAGO, ILLINOIS.

LUBRICANT-SEPARATOR.

945,427.  Specification of Letters Patent.  Patented Jan. 4, 1910.

Application filed February 13, 1909. Serial No. 477,776.

*To all whom it may concern:*

Be it known that I, THOMAS J. WATERS, a citizen of the United States, residing at Chicago, in the county of Cook and State of Illinois, have invented a new and useful Improvement in Lubricant-Separators, of which the following is a specification.

My invention relates to an improvement in that class of separators which are employed for separating the lubricant from exhaust-steam which has been carried by the latter from the engine.

The primary object of my invention is to provide an improved construction of separator whereby a maximum amount of lubricant carried by the exhaust-steam shall be separated therefrom without unduly impeding the circulation through the device.

In the accompanying drawing: Figure 1 is a broken view showing my improved device in vertical sectional elevation, and Fig. 2 is an enlarged plan section taken on line 2, Fig. 1.

A casing comprising a head 3 and a cylinder 4 closed at its lower end, except for a discharge opening hereinafter described, are secured together at their abutting flanges, and a pipe 5 for exhaust-steam open at its lower end and extending to within a short distance of the corresponding end of the cylinder, is flanged to the head to extend centrally of the cylinder. Leading from a discharge opening in the lower end of the cylinder is a pipe 6 for the purpose of conducting therefrom the condensation and oil to a suitable trap (not shown). A discharge-port 7 is provided in the head through which the exhaust-steam is conducted from the separator.

Four similar yokes 8, forming a preferred form of baffle-support, each of a width to just equal the space between the pipe 5 and cylinder 4 and joined at their lower ends by struts 9, are supported on a flange 10 projecting from the inner surface of the cylinder near its lower end. An inner series of conical baffle-rings 11 provided with down-turned flanges 12 and 13 has each of such members riveted through the flange 13 to the yoke-sections adjacent to the pipe 5, and a series of outer conical baffle-rings 14 provided with down-turned flanges 15 and 16 are similarly secured at their flanges 16 to the outer sections of the yokes; the yokes and baffling-rings forming a baffling skeleton-cylinder removable by withdrawal from the cylinder 4, upon disconnecting the latter from the head 3.

The rings 11 and 14 are attached to the yokes in staggered relation, that is, the inner rings alternate with the outer rings, and the outer diameter of each ring 11 is slightly greater than that of the openings through the rings 14 so that they overlap, and the steam upon leaving the inner end of the pipe 5 passes upward past the baffling-rings and is thereby directed through a zig-zag course through the cylinder 5 to the head 3 to discharge, free of lubricant, through the port 7.

The rings 11 incline downwardly from their outer edges to their central openings to leave a space between them and the pipe 5 equal to the thickness of the yoke-members. The rings 14 incline downwardly, but from their inner edges to their outer peripheries to leave a space between them and the cylinder 4 equal to the thickness of the adjacent yoke-sections.

The operation is as follows: As the exhaust-steam from the engine passes downward through the pipe 5 it expands upon reaching the cylinder at the end of the pipe, and at this time drops much of the oil in the cup-shaped cylinder-end from which it is trapped by way of the pipe 6. As the steam passes upward in the space between the pipe and cylinder, through the baffle-rings 14 and past the baffle-rings 11, it strikes the under inclined surface of each succeeding baffle-ring by which it is deflected. As the steam strikes the under surface of each ring some of the oil adheres to this surface and some is carried onward by the steam to the next upper ring while some will be deflected by the action of the steam from the under side of one ring to the upper surface of the next ring below, by which it is caught. The oil caught by both the under and upper inclined surfaces of each ring drops from the lower flange of each baffle-ring to eventually lodge in and be drawn from the end of the cylinder through the pipe 6.

A particular advantage of the construction is that of its adapting the internal baffling skeleton-cylinder to be readily withdrawn longitudinally from the cylinder 4 for cleansing purposes, upon removing the head 3 and the pipe 5.

While the device is more particularly described herein as a lubricant separator, it is equally effective as a "steam-separator".

meaning for separating the water of condensation from steam.

What I claim as new and desire to secure by Letters Patent is—

1. In a separator of the character described, the combination of a casing provided with a discharge-outlet, a steam-pipe supported in the casing, and a baffling skeleton-cylinder longitudinally withdrawable from and insertible into the casing and surrounding said pipe therein, for the purpose set forth.

2. A separator of the character described comprising, in combination, a casing formed with a cup on one end having an opening provided with a discharge-pipe, a hollow head on the opposite end of the casing provided with an exhaust port, a steam-pipe extending through said head into the casing and a baffling skeleton-cylinder supported in the casing about said pipe, for the purpose set forth.

3. In a separator of the character described, the combination with a casing provided with a discharge-outlet, a steam-pipe supported in the casing, a baffle-ring support in the casing, and a series of baffle-rings on said support about the pipe and forming a zig-zag course for exhaust-steam discharging from said pipe.

4. In a separator of the character described, the combination of a casing provided with a discharge-outlet, a steam-pipe supported in the casing, a baffle-ring support in the casing, and a staggered series of conical baffle-rings about the pipe on said support and forming a zig-zag course for exhaust-steam discharging from said pipe.

5. In a separator of the character described, the combination of a casing provided with a discharge-outlet, a steam-pipe supported in the casing, a baffle-ring support in the casing, and a series of conical baffle-rings, of successively greater and lesser diameter, about the pipe in said support, and relatively inclining in successively contrary directions, with the rings of lesser diameter overlapping the openings in those of greater diameter.

6. In a separator of the character described, the combination of a casing provided with a discharge-outlet, a steam-pipe supported in the casing, a series of yokes confined in the casing to extend lengthwise thereof about said pipe, a series of conical baffle-rings secured to the outer yoke-members to surround said pipe, and a series of conical baffle-rings, of lesser diameter than and alternating with said first-named series, secured to the inner yoke-members to surround said pipe.

7. In a separator of the character described, the combination of a casing provided with a discharge-outlet, a steam-pipe supported in the casing, a series of yokes withdrawably confined in the casing to extend lengthwise thereof about said pipe, a series of conical baffle-rings having flanges depending from their opposite edges and secured at their outer flanges to the outer yoke-members to surround said pipe, and a series of conical baffle-rings, flanged like and of lesser diameter than and alternating with said first-named series, secured through their inner flanges to the inner yoke-members to surround said pipe.

THOMAS J. WATERS.

In presence of—
DAVID R. WATERS,
RALPH SCHAEFER.